(12) United States Patent
Sawada

(10) Patent No.: US 11,706,544 B2
(45) Date of Patent: Jul. 18, 2023

(54) IMAGING DEVICE WITH IMAGE ENCRYPTION

(71) Applicant: SK hynix Inc., Icheon-si (KR)

(72) Inventor: Ken Sawada, Tokyo (JP)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/729,921

(22) Filed: Apr. 26, 2022

(65) Prior Publication Data
US 2022/0385849 A1 Dec. 1, 2022

(30) Foreign Application Priority Data
May 27, 2021 (KR) .................. 10-2021-0068493

(51) Int. Cl.
*H04N 25/77* (2023.01)
*H04L 9/32* (2006.01)
*H04N 25/74* (2023.01)
*H04N 25/75* (2023.01)

(52) U.S. Cl.
CPC ........... *H04N 25/77* (2023.01); *H04L 9/3278* (2013.01); *H04N 25/74* (2023.01); *H04N 25/75* (2023.01)

(58) Field of Classification Search
CPC ........ H04N 25/77; H04N 25/74; H04N 25/75; H04L 9/3278
See application file for complete search history.

(56) References Cited

U.S. PATENT DOCUMENTS

| | | | |
|---|---|---|---|
| 8,514,298 B2 * | 8/2013 | Ordoubadian | H04N 25/60 348/231.2 |
| 10,356,353 B2 | 7/2019 | Okura et al. | |
| 10,382,708 B2 * | 8/2019 | Takayanagi | H04N 23/00 |
| 11,316,687 B2 * | 4/2022 | Zitlaw | H04L 63/068 |
| 2010/0134647 A1 * | 6/2010 | Orboubadian | H04N 1/32149 348/222.1 |
| 2018/0115723 A1 * | 4/2018 | Takayanagi | H04N 25/76 |

(Continued)

OTHER PUBLICATIONS

Chattopadhyay, A. et al., "FPGA Based Cyber Security Protocol for Automated Traffic Monitoring Systems: Proposal and Implementation." 2016 IEEE Computer Society Annual Symposium on VLSI. 6 pages.

(Continued)

*Primary Examiner* — Nicholas G Giles
(74) *Attorney, Agent, or Firm* — Perkins Coie LLP

(57) ABSTRACT

An imaging device includes an image sensing device, a private key generation unit, and an image encryption unit. The image sensing device includes an image generator configured to generate image data acquired by capturing as image, and a physical unclonable function (PUF) generator configured to generate physical unclonable function (PUF) data including information about at least one fixed pattern noise (FPN) data value and at least one random telegraph noise (RTN) data value. The private key (KEY) generation unit generates a private key based on the at least one FPN data value and the at least one RTN data value that are acquired from the PUF data. The image encryption unit encrypts the image data using the private key. A first transistor included in the PUF generator exhibits different properties from a second transistor that is included in the image generator and corresponds to the first transistor.

19 Claims, 10 Drawing Sheets

(56) References Cited

U.S. PATENT DOCUMENTS

2019/0373195 A1 12/2019 Minagawa et al.
2020/0287716 A1* 9/2020 Zitlaw .................. H04L 63/068

OTHER PUBLICATIONS

Choi, D. et al., "Two-Factor Fuzzy Commitment for Unmanned IoT Devices Security." IEEE Internet of Things Journal, vol. 6, No. 1, Feb. 2019, pp. 335-348.
Kang, H. et al., "Cryptographic Key Generation from PUF Data Using Efficient Fuzzy Extractors." The 16th International Conference on Advanced Communications Technology (ICACT 2014), 4 pages.
Okura, S. et al., "A2-Mpixel CMOS Image Sensor with Device Authentication and Encryption Key Generation based on Physically Unclonable Function." Jun. 23-27, 2019. 4 pages.
Suh, G.E. et al., "Physical Unclonable Functions for Device Authentication and Secret Key Generation." DAC 2007, Jun. 4-8, 2007, 6 pages.

* cited by examiner

IMAGING DEVICE WITH IMAGE ENCRYPTION

CROSS-REFERENCE TO RELATED APPLICATION

This patent document claims the priority and benefits of Korean patent application No. 10-2021-0068493, filed on May 27, 2021, the disclosure of which is incorporated herein by reference in its entirety as part of the disclosure of this patent document.

TECHNICAL FIELD

The technology and implementations disclosed in this patent document generally relate to an imaging device having an encryption function of image data.

BACKGROUND

An image sensing device is a semiconductor device for capturing and converting light of optical images into electrical signals for displaying the captured images and for further processing of the captured images. The recent development of various industries and sectors, including automotive, medical, computer and communication industries generates various demands for high-performance image sensors in various devices, such as smartphones, digital cameras, game machines, IoT (Internet of Things), robots, security cameras and medical micro cameras.

The image sensing device may be roughly divided into CCD (Charge Coupled Device) image sensing devices and CMOS (Complementary Metal Oxide Semiconductor) image sensing devices. CCD image sensing devices offer a better image quality, but they tend to consume more power and are larger as compared to the CMOS image sensing devices. CMOS image sensing devices are smaller in size and consume less power than the CCD image sensing devices. Furthermore, CMOS sensors are fabricated using the CMOS fabrication technology, and thus photosensitive elements and other signal processing circuitry can be integrated into a single chip, enabling the production of miniaturized image sensing devices at a lower cost. For these reasons, CMOS image sensing devices are being developed for many applications including mobile devices.

SUMMARY

Various embodiments of the disclosed technology relate to an imaging device having an encryption function with high stability against hacking of image data.

In an embodiment of the disclosed technology, an imaging device may include: an image sensing device including an image generator configured to generate image data by converting incident light carrying an image into electric signals indicative of the image, and a physical unclonable function (PUF) generator configured to generate physical unclonable function (PUF) data associated with unique physical characteristics of the image sensing device and including at least one fixed pattern noise (FPN) data value corresponding to a fixed pattern noise of the image sensing device and at least one random telegraph noise (RTN) data value corresponding to a random telegraph noise of the image sensing device; a private key generation unit in communication with the image sensing device and configured to generate a private key based on the at least one FPN data value and the at least one RTN data value acquired from the PUF data; and an image encryption unit in communication with the image sensing device and the private key generation unit and configured to encrypt the image data using the private key, wherein the PUF generator includes a first transistor and the image generator includes a second transistor corresponding to the first transistor, and wherein the first transistor exhibits different properties from the second transistor.

In another embodiment of the disclosed technology, an imaging device may include: an image sensing device including: one or more first image detection pixels and one or more second image detection pixels structured to convert light incident onto the image detection pixels into pixel signals representing an image; a first transistor coupled to the one or more first image detection pixels and structured to generate physical unclonable function (PUF) data including information about at least one fixed pattern noise (FPN) data value and at least one random telegraph noise (RTN) data value; and a second transistor coupled to the one or more second image detection pixels and structured to generate image data acquired by converting light corresponding to the image; a private key generation unit configured to generate a private key based on the at least one FPN data value and the at least one RTN data value of the PUF data; and an image encryption unit configured to encrypt the image data using the private key, wherein the first transistor exhibits different noise properties from the second transistor.

In another embodiment of the disclosed technology, an imaging device may include an image sensing device, a private key generation unit, and an image encryption unit. The image sensing device may include an image generator configured to generate image data acquired by capture of a scene image, and a physical unclonable function (PUF) generator configured to generate physical unclonable function (PUF) data including information about at least one fixed pattern noise (FPN) and at least one random telegraph noise (RTN). The private key generation unit may generate a private key based on the at least one FPN and the at least one RTN that are acquired from the PUF data. The image encryption unit may encrypt the image data using the private key. A first transistor included in the PUF generator may have different characteristics from a second transistor that is included in the image generator and corresponds to the first transistor.

In another embodiment of the disclosed technology, an imaging device may include an image sensing device, a private key generation unit, and an image encryption unit. The image sensing device may include a first transistor related to generation of physical unclonable function (PUF) data including information about at least one fixed pattern noise (FPN) and at least one random telegraph noise (RTN), and a second transistor related to generation of image data acquired by capture of a scene image. The private key generation unit may generate a private key based on the at least one FPN and the at least one RTN of the PUF data. The image encryption unit may encrypt the image data using the private key. The first transistor may have different characteristics from the second transistor.

It is to be understood that both the foregoing general description and the following detailed description of the disclosed technology are illustrative and explanatory and are intended to provide further explanation of the disclosure as claimed.

DETAILED DESCRIPTION

Figure 1:
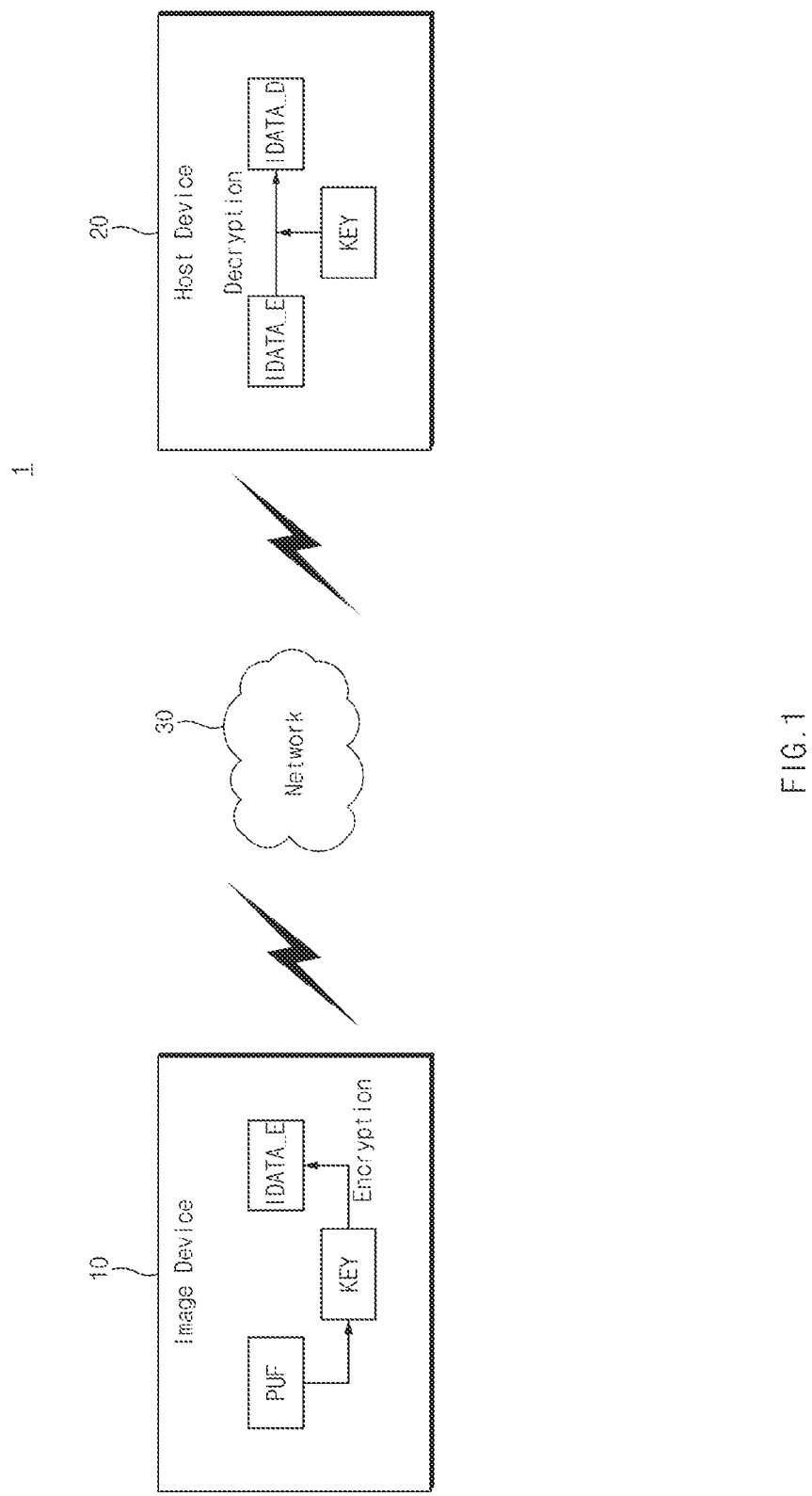
FIG. 1 illustrates an example of a system in which an imaging device transmits image data to a host device through a network.

This patent document provides implementations and examples of an imaging device that can encrypt image data. The disclosed technology can be implemented in some embodiments to provide image data encryption scheme for high data security. An imaging device implemented based on some embodiments of the disclosed technology can encrypt image data using (1) information that is associated with internal unique characteristics of the imaging device and (2) information that is randomly generated based on such unique characteristics, thereby improving data security.

Reference will now be made in detail to the embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein.

Hereafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

FIG. 1 illustrates an example of a system 1 in which an imaging device transmits image data to a host device through a network.

Referring to FIG. 1, the system 1 may include an imaging device 10, a host device 20, and a network 30.

In some implementations, the imaging device 10 may include any mechanical, digital, or electronic viewing device, still camera, camcorder, motion picture camera, or any other instrument, equipment, or format capable of recording, storing, or transmitting visual images. Examples of the imaging device 10 may include a mobile device (e.g., a smartphone, a digital camera, etc.), a personal computer (PC), a laptop, a home or industrial system including a monitoring camera (e.g., closed circuit television CCTV), or others.

The imaging device 10 may generate image data by capturing an image of a scene based on a request of the host device 20 or predefined rules (e.g., at a certain interval, or when a certain condition is met), and may transmit the image data to the host device 20 through the network 30. Here, the imaging device 10 may generate a private key (KEY) using a physical unclonable function (PUF), which refers to a unique identifier of a physical property for a certain device such as a semiconductor device. The PUF can be based on unique physical variations or certain unique random characteristics which occur naturally during a semiconductor fabrication process. The imaging device 10 may encrypt image data using the PUF-based private key (KEY), and may output the encrypted image data to another device such as the host device 20.

Here, the PUF may refer to information that is generated based on unique characteristics or unique physical variations of the imaging device 10. The PUF may include a fixed pattern noise (FPN) or a FPN data corresponding to the FPN. In one example, the FPN may indicate a particular noise pattern on the imaging device 10. Such a particular noise pattern may occur due to the unique characteristics or unique physical variations of the imaging device 10. The PUF may also include a random telegraph noise (RTN) or a RTN data corresponding to the RTN. In one example, the RTN may indicate sudden transitions between two or more discrete voltage or current levels at random and unpredictable times. The RTN may be caused by the unique characteristics or unique physical variations of the imaging device 10. In some implementations, the PUF may include at least one FPN data and at least one RTN data.

The imaging device 10 may perform a bitwise operation (e.g., AND, OR, XOR, NOT, etc.) on at least one FPN data value and at least one RTN data value of the PUF to generate a private key (KEY). In some implementations, assuming that the PUF includes one FPN data value (e.g., a first FPN data value) and two RTN data values (e.g., a first RTN data value and a second RTN data value), the imaging device 10 may generate a private key (KEY) by performing a first XOR operation on the first FPN data and the first RTN data and by performing a second XOR operation on the second RTN data and the result of the first XOR operation. In other implementations, the order of operations for performing bitwise operations on at least one FPN data and at least one RTN data may be different from what is discussed above.

The imaging device 10 may encrypt image data generated by capturing light corresponding to an image of a scene using the private key (KEY) and generate encrypted image data (IDATA_E). The imaging device 10 may divide image data into a plurality of blocks, and may encrypt each of the blocks using the private key (KEY) to generate encrypted image data (IDATA_E). In some implementations, a symmetric-key encryption method such as advanced encryption standard (AES) can be used to encrypt image data.

The imaging device 10 may transmit the encrypted image data (IDATA_E) to the host device 20 through the network 30.

The host device 20 may include a device that is configured to communicate with the imaging device 10. In some implementations, the host device 20 may be configured to perform operations associated with generating, collecting, processing, and/or storing image data, for example, in the same manner as in the imaging device 10. In one example, the host device 20 may include a server (e.g., a cloud server) configured to collect and store image data.

The host device 20 may receive the encrypted image data (IDATA_E) from the image data 10, and may decrypt the encrypted image data (IDATA_E) using the private key (KEY) to generate decrypted image data (IDATA_D). In this case, the method for performing such a decryption operation may be a symmetric-key decryption method. That is, the imaging device 10 performs the decryption operation such that the decrypted image data (IDATA_D) is identical to image data formed before the encryption.

The network 30 may provide a channel for data communication between the imaging device 10 and the host device 20. For example, the network 30 may provide a channel for a mobile communication or a near field communication (NFC), or a wired network channel for Ethernet communication or serial communication (e.g., universal serial bus USB), or a combination thereof.

In a case that the network 30 is an unsecured network, image data transmitted from the imaging device 10 to the host device 20 may be exposed to risks of data breaches, malicious exploitation or unauthorized use of the image data. Private images of an individual or images with personal information that are exposed to unauthorized people can result in serious damage to the privacy of the individual.

In order to protect the user's privacy, some embodiments of the disclosed technology can generate the encrypted image data (IDATA_E) encrypted based on the PUF, which is determined based on the unique physical characteristics of the imaging device 10. The encrypted image data (IDATA_E) is communicated between the imaging device 10 and the host device 20 through the network 30, thereby providing a higher security level and preventing unauthorized people from using or altering the image data. The PUF may include (1) first information that includes a fixed value determined based on unique characteristics of the imaging device 10, and (2) second information that includes a randomly varying value that varies depending on the unique characteristics of the imaging device 10. As a result, even when the first information of the imaging device 10 is fraudulently acquired by other people, the second information can provide an additional protection to the first information against an unauthorized use of the image data.

Figure 2:
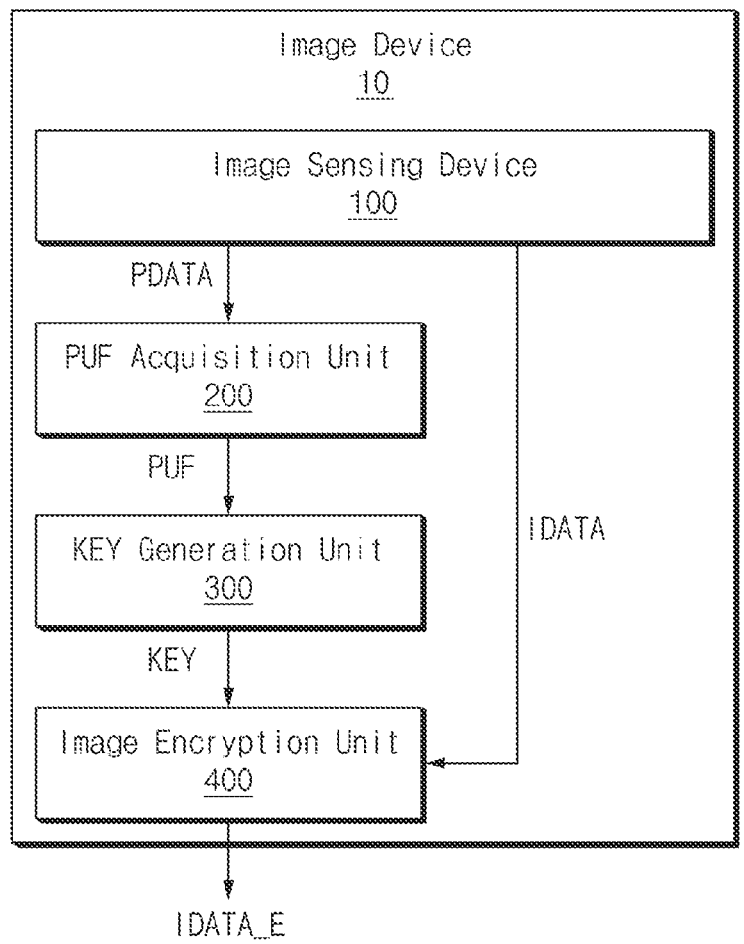
FIG. 2 is a block diagram illustrating an example of an imaging device shown in FIG. 1 based on some implementations of the disclosed technology.

FIG. 2 is a block diagram illustrating an example of the imaging device 10 shown in FIG. 1 based on some implementations of the disclosed technology.

Referring to FIG. 2, the imaging device 10 may include an image sensing device 100, a physical unclonable function (PUF) acquisition unit 200, a private key (KEY) generation unit 300, and an image encryption unit 400.

The image sensing device 100 may capture light corresponding to an image of a scene to generate image data (IDATA), and may generate PUF data (PDATA) provided with information (hereinafter referred to as PUF information) associated with the physical unclonable function (PUF).

The image sensing device 100 may operate in any one of a plurality of PUF modes, and each PUF mode may correspond to information included in the PUF. For example, assuming that the PUF includes one FPN data value (e.g., the first FPN data value) and two RTN data values (e.g., the first RTN data value and the second RTN data value), a plurality of modes may include a first PUF mode to generate the first FPN data, a second PUF mode to generate the first RTN data, and a third PUF mode to generate the second RTN data. As will be discussed below, the image sensing device 100 may include functional blocks illustrated in FIG. 3.

The PUF acquisition unit 200 may receive PUF data (PDATA) to implement the physical unclonable function (PUF). For example, the PUF acquisition unit 200 may acquire the first FPN data from the PUF data (PDATA) generated by the image sensing device operating in a first PUF mode. In addition, the PUF acquisition unit 200 may acquire the first RTN data from the PUF data (PDATA) generated by the image sensing device 100 operating in a second PUF mode. The PUF acquisition unit 200 may also acquire the second RTN data from the PUF data (PDATA) generated by the image sensing device 100 operating in a third PUF mode. The PUF acquisition unit 200 may receive information about the PUF mode from the image sensing device 100 to identify the mode corresponding to the PUF data (PDATA) generated.

The KEY generation unit 300 may receive the PUF from the PUF acquisition unit 200, and may generate a private key (KEY) based on the received PUF. In some implementations, the KEY generation unit 300 may perform a bitwise operation (e.g., AND, OR, XOR, NOT, etc.) on at least one FPN data value and at least one RTN data value of the PUF to generate the private key (KEY). In this case, the KEY generation unit 300 can select at least one FPN data value and at least one RTN data value, and arrange and calculate the selected at least one FPN data value and the selected at least one RTN data value according to a predetermined algorithm. For example, the KEY generation unit 300 may select specific PUF pixels from among PUF pixels or may select specific PUF ADCs from among the PUF ADCs. The KEY generation unit 300 may arrange at least one FPN data value obtained from the selected PUF pixels or at least one RTN data value obtained from the selected PUF ADCs in a predetermined order, and may perform a predetermined operation on the arranged FPN data values and RTN data values.

In some implementations, the KEY generation unit 300 selects one or more FPN data values and one or more RTN data values, and arranges and calculates the selected FPN data and the selected RTN data according to a predetermined algorithm and/or the intervals between the patterns or the noise signals may be predetermined.

The image encryption unit 400 may encrypt, using the private key (KEY), image data (IDATA), which is generated by capturing and converting incident light into electric signals, to generate encrypted image data (IDATA_E). The imaging device 10 may divide the image data (IDATA) into a plurality of blocks, and may encrypt each of the blocks using the private key (KEY) to generate the encrypted image data (IDTA_E).

Figure 3:
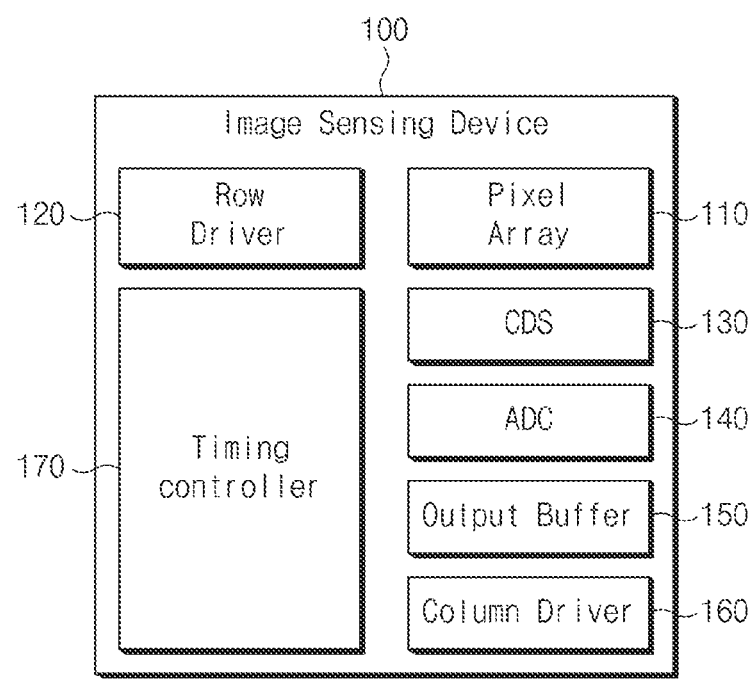
FIG. 3 is a block diagram illustrating an example of an image sensing device shown in FIG. 2 based on some implementations of the disclosed technology.

FIG. 3 is a block diagram illustrating an image sensing device 100 shown in FIG. 2 according to an embodiment of the disclosed technology.

Referring to FIG. 3, the image sensing device 100 may include a pixel array 110, a row driver 120, a correlated double sampler (CDS) 130, an analog-digital converter (ADC) 140, an output buffer 150, a column driver 160, and a timing controller 170. The components of the image sensing device 100 illustrated in FIG. 3 are discussed by way of example only, and this patent document encompasses numerous other changes, substitutions, variations, alterations, and modifications.

The pixel array 110 may include a plurality of unit pixels arranged in rows and columns. In one example, the plurality of unit pixels can be arranged in a two dimensional pixel array including rows and columns. In another example, the plurality of unit pixels can be arranged in a three dimensional pixel array. The plurality of unit pixels may convert an optical signal into an electrical signal on a unit pixel basis or a pixel group basis, where unit pixels in a pixel group share at least certain internal circuitry. The pixel array 110 may receive driving signals, including a row selection signal, a pixel reset signal and a transmission signal, from the row driver 120. Upon receiving the driving signal, corresponding imaging pixels in the pixel array 110 may be activated to perform the operations corresponding to the row selection signal, the pixel reset signal, and the transmission signal.

The row driver 120 may activate the pixel array 110 to perform certain operations on the imaging pixels in the corresponding row based on commands and control signals provided by controller circuitry such as the timing controller 170. In some implementations, the row driver 120 may select one or more imaging pixels arranged in one or more rows of the pixel array 110. The row driver 120 may generate a row selection signal to select one or more rows among the plurality of rows. The row decoder 120 may sequentially enable the pixel reset signal for resetting imaging pixels corresponding to at least one selected row, and the transmission signal for the pixels corresponding to the at least one selected row. Thus, a reference signal and an image signal, which are analog signals generated by each of the imaging pixels of the selected row, may be sequentially transferred to the CDS 130. The reference signal may be an electrical signal that is provided to the CDS 130 when a sensing node of an imaging pixel (e.g., floating diffusion node) is reset, and the image signal may be an electrical signal that is provided to the CDS 130 when photocharges generated by the imaging pixel are accumulated in the sensing node.

CMOS image sensors may use the correlated double sampling (CDS) to remove undesired offset values of pixels known as the fixed pattern noise by sampling a pixel signal twice to remove the difference between these two samples. In one example, the correlated double sampling (CDS) may remove the undesired offset value of pixels by comparing pixel output voltages obtained before and after photocharges generated by incident light are accumulated in the sensing node so that only pixel output voltages based on the incident light can be measured. In some embodiments of the disclosed technology, the CDS 130 may sequentially sample and hold voltage levels of the reference signal and the image signal, which are provided to each of a plurality of column lines from the pixel array 110. That is, the CDS 130 may sample and hold the voltage levels of the reference signal and the image signal which correspond to each of the columns of the pixel array 110.

In some implementations, the CDS 130 may transfer the reference signal and the image signal of each of the columns as a correlate double sampling signal to the ADC 140 based on control signals from the timing controller 170.

The ADC 140 is used to convert analog CDS signals into digital signals. In some implementations, the ADC 140 may be implemented as a ramp-compare type ADC. The ramp-compare type ADC may include a comparator circuit for comparing the analog pixel signal with a reference signal such as a ramp signal that ramps up or down, and a timer counts until a voltage of the ramp signal matches the analog pixel signal. In some embodiments of the disclosed technology, the ADC 140 may convert the correlate double sampling signal generated by the CDS 130 for each of the columns into a digital signal, and output the digital signal.

The ADC 140 may perform a counting operation and a computing operation based on the correlate double sampling signal for each of the columns and a ramp signal provided from the timing controller 170. In this way, the ADC 140 may eliminate or reduce noises such as reset noise arising from the imaging pixels when generating digital image data.

The ADC 140 may include a plurality of column counters. Each column of the pixel array 110 is coupled to a column counter, and image data can be generated by converting the correlate double sampling signals received from each column into digital signals using the column counter. In another embodiment of the disclosed technology, the ADC 140 may include a global counter to convert the correlate double sampling signals corresponding to the columns into digital signals using a global code provided from the global counter.

The output buffer 150 may temporarily hold the column-based image data provided from the ADC 140 to output the image data. In one example, the image data provided to the output buffer 150 from the ADC 140 may be temporarily stored in the output buffer 150 based on control signals of the timing controller 170. The output buffer 150 may provide an interface to compensate for data rate differences or transmission rate differences between the image sensing device 100 and other devices.

The column driver 160 may select a column of the output buffer upon receiving a control signal from the timing controller 170, and sequentially output the image data, which are temporarily stored in the selected column of the output buffer 150. In some implementations, upon receiving an address signal from the timing controller 170, the column driver 160 may generate a column selection signal based on the address signal and select a column of the output buffer 150, outputting the image data as an output signal from the selected column of the output buffer 150.

The timing controller 170 may control operations of the row driver 120, the ADC 140, the output buffer 150 and the column driver 160.

The timing controller 170 may provide the row driver 120, the column driver 160 and the output buffer 150 with a clock signal required for the operations of the respective components of the image sensing device 100, a control signal for timing control, and address signals for selecting a row or column. In an embodiment of the disclosed technology, the timing controller 170 may include a logic control circuit, a phase lock loop (PLL) circuit, a timing control circuit, a communication interface circuit and others.

Figure 4:
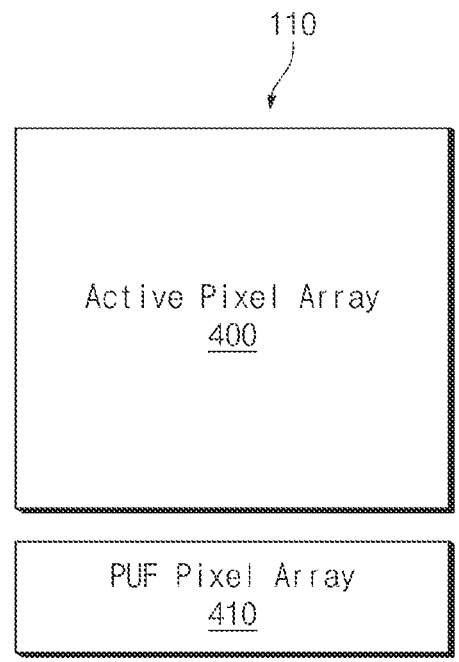
FIG. 4 is a block diagram illustrating an example of a pixel array shown in FIG. 3 based on some implementations of the disclosed technology.

FIG. 4 is a block diagram illustrating an example of the pixel array 110 shown in FIG. 3 based on some implementations of the disclosed technology.

Referring to FIG. 4, the pixel array 110 may include an active pixel array 400 and a PUF pixel array 410.

The active pixel array 400 may include at least one image pixel for generating image data (IDATA) by capturing and converting light corresponding to an image of a scene. The PUF pixel array 410 may include at least one PUF pixel for generating PUF data (PDATA) including information about the PUF. Image pixels and PUF pixels may correspond to the plurality of unit pixels shown in FIG. 3.

Although FIG. 4 illustrates the PUF pixel array 410 as being disposed at one side (e.g., a lower side) of the active pixel array 400 for convenience of description, the disclosed technology is not limited thereto. In some implementations, the PUF pixel array 410 may be disposed on upper, lower, left, and/or right side of the active pixel array 400. In some implementations, at least one PUF pixel may be included in the active pixel array 400.

Figure 5:
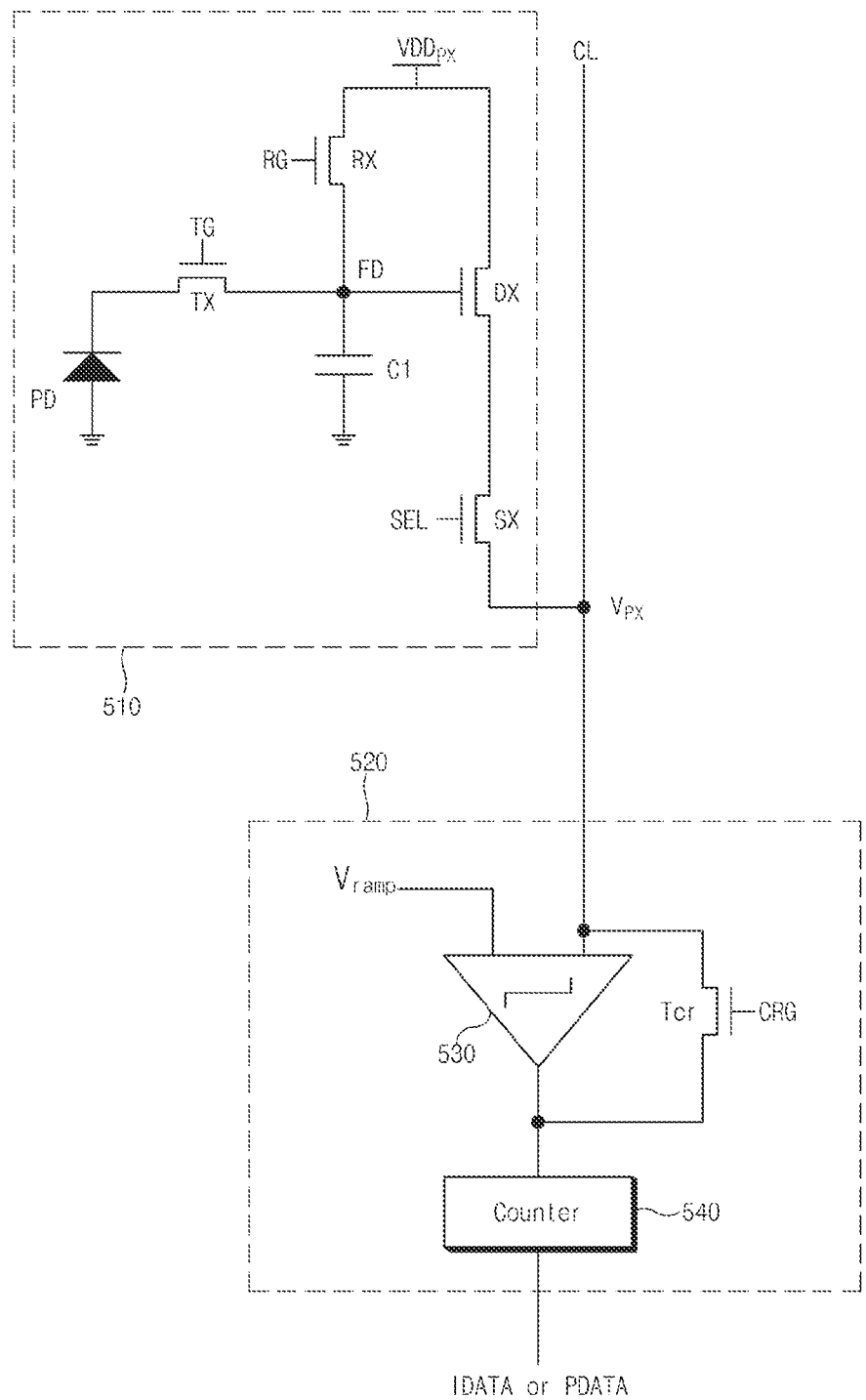
FIG. 5 is a circuit diagram illustrating an example of a unit pixel shown in FIG. 3 and an analog-to-digital converter (ADC) connected to the unit pixel based on some implementations of the disclosed technology.
Figure 6:
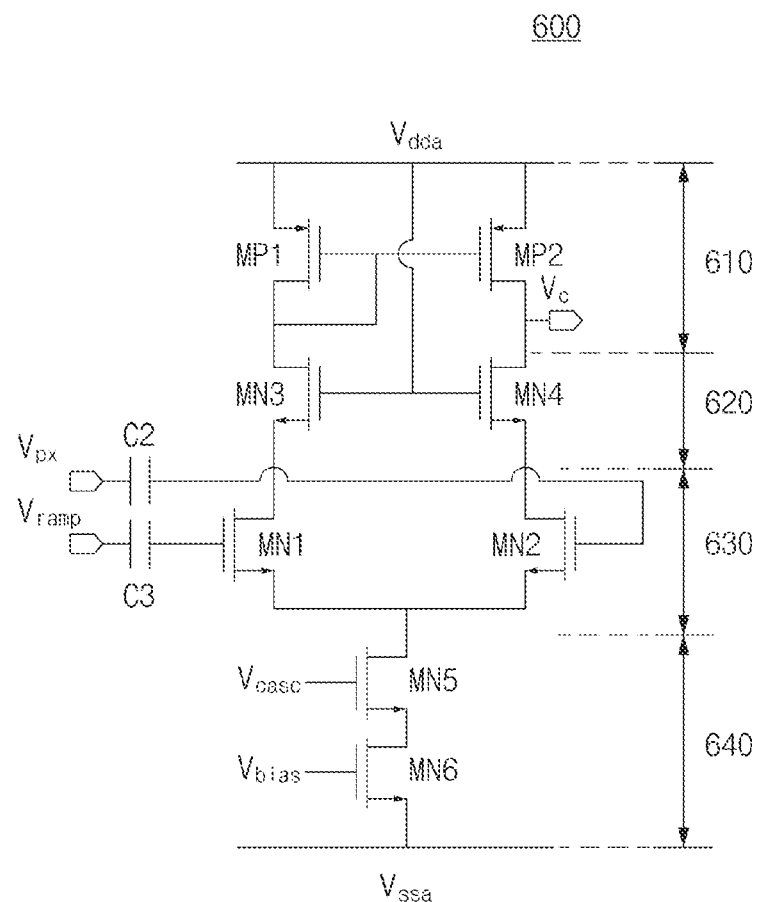
FIG. 6 is a circuit diagram illustrating an example of a comparator shown in FIG. 5 based on some implementations of the disclosed technology.

FIG. 5 is a circuit diagram illustrating an example of the unit pixel 510 shown in FIG. 3 and the analog-to-digital converter (ADC) 520 connected to the unit pixel based on some implementations of the disclosed technology. FIG. 6 is a circuit diagram illustrating an example of the comparator shown in FIG. 5 based on some implementations of the disclosed technology.

FIG. 5 illustrates the unit pixel 510 and the ADC 520 electrically coupled to the unit pixel 510. The unit pixel 510 and the ADC 520 may be electrically coupled to each other through a column line CL. Although FIG. 5 illustrates only one unit pixel 510 coupled to the column line CL for convenience of description, it should be noted that other unit pixels belonging to the same column as the unit pixel 510 can also be coupled to the column line CL.

The unit pixel 510 may be an image pixel or a PUF pixel. Here, the image pixel may be configured to generate image data and the PUF pixel may be configured to generate PUF data. When the unit pixel 510 is the image pixel, the column line CL may be coupled to other image pixels belonging to the same column as the unit pixel 510 in the active pixel array 400. When the unit pixel 510 is the PUF pixel, the column line CL may be coupled to other PUF pixels belong to the same column as the unit pixel 510 in the PUF pixel array 410. However, when the unit pixel 510 is the image pixel, the column line CL is not coupled to the PUF pixel. Similarly, when the unit pixel 510 is the PUF pixel, the column line CL is not coupled to the image pixel. In other words, the image pixel and the PUF pixel may be coupled to different ADCs 520 that operate independently of each other. Although the image pixel and the PUF pixel belong to the same column, the image pixel and the PUF pixel may be coupled to different column lines and may output pixel signals to different ADCs 520.

The image sensing device 100 may include an image generation unit to generate image data (IDATA), and a PUF generation unit to generate PUF data (PDATA). The image generation unit may include an image pixel and an image ADC coupled to the image pixel. The PUF generation unit may include a PUF pixel and a PUF ADC coupled to the PUF pixel.

The image pixel and the PUF pixel may have a similar or identical structure (e.g., the structure of the unit pixel 510). One ADC coupled to the image pixel and the other ADC coupled to the PUF pixel may have substantially the same structure (e.g., the structure of the ADC 520). The ADC coupled to the image pixel may be defined as an image ADC for converting analog image data to digital image data, and the ADC coupled to the PUF pixel may be defined as a PUF ADC for converting analog PUF data to digital PUF data.

The unit pixel 510 may include a photoelectric conversion element PD, a transfer transistor TX, a reset transistor RX, a floating diffusion region FD, a first capacitor C1, a drive transistor DX, and a selection transistor SX. Although FIG. 5 illustrates that the unit pixel 510 includes only one photoelectric conversion element PD for convenience of description, the unit pixel 510 may include a plurality of photoelectric conversion elements (PDs). In this case, the unit pixel 510 may include the plurality of transfer transistors (TXs) coupled to the plurality of photoelectric conversion elements (PDs).

Each of the photoelectric conversion elements (PDs) may generate photocharges corresponding to the intensity of incident light, and the photocharges are accumulated at or near the photoelectric conversion elements (PDs). For example, each of the photoelectric conversion elements (PDs) may be implemented as a photodiode, a phototransistor, a photogate, a pinned photodiode or a combination thereof.

If the photoelectric conversion element PD is implemented as a photodiode, the photoelectric conversion element PD may include a region that is doped with second conductive impurities (e.g., N-type impurities) in a substrate including first conductive impurities (e.g., P-type impurities).

The transfer transistor TX may be coupled between the photoelectric conversion element PD and the floating diffusion region FD. The transfer transistor TX may be turned on or off in response to a transfer control signal TG. If the transfer transistor TX is turned on, photocharges generated/accumulated in the corresponding photoelectric conversion element PD can be transmitted to the floating diffusion region FD.

The reset transistor RX may be disposed between the floating diffusion region FD and the power-supply voltage ($VDD_{px}$), and the voltage of the floating diffusion region FD can be reset to the power-supply voltage ($VDD_{px}$) in response to a reset control signal RG.

The floating diffusion region FD may hold photocharges received from the transfer transistor TX. The floating diffusion region FD can be coupled to a first capacitor C1 connected to a ground voltage terminal. For example, the floating diffusion region FD may be a region that is doped with second conductive impurities (e.g., N-type impurities) in a substrate (e.g., a P-type substrate) including first conductive impurities. In this case, the substrate and the impurity doped region can constitute the first capacitor C1 illustrated in FIG. 5, acting as a junction capacitor. That is, the first capacitor C1 may include one or more capacitive elements that constitute the capacitance of the floating diffusion region FD. In another embodiment, the first capacitor C1 may include the floating diffusion region FD and a separate capacitive element (e.g., a Metal-Insulator-Metal (MIM) capacitor, etc.) such that the capacitance of the separate capacitive element is added to the capacitance of the floating diffusion region FD. In another embodiment, a separate capacitive element may be selectively coupled to the floating diffusion region FD through a dual conversion gain (DCG) transistor so that the unit pixel 510 can have a large dynamic range.

The drive transistor DX may be coupled between the power-supply voltage ($VDD_{px}$) and the selection transistor SX, may convert a voltage or electric potential of the floating diffusion region FD with photocharges transferred from the photoelectric conversion element PD into a voltage signal, and may transmit the voltage signal to the selection transistor SX.

A gate electrode of the drive transistor DX of the image pixel may be larger in size than a gate electrode of the drive transistor DX of the PUF pixel.

The selection transistor SX may be coupled between the drive transistor DX and the column line CL, may be turned on by a row selection signal SEL, and may output an electrical signal received from the drive transistor DX as a pixel signal ($V_{px}$).

The ADC 520 configured to receive the pixel signal ($V_{px}$) from the unit pixel 510 may include a second capacitor C2, a comparator reset transistor (Tcr), a comparator 530, and a counter 540.

The second capacitor C2 may be coupled between the column line CL and a first input terminal of the comparator 530 to remove noise (e.g., high-frequency noise) included in the pixel signal ($V_{px}$).

The comparator reset transistor (Tcr) may be coupled between the first input terminal of the comparator 530 and the output terminal of the comparator 530. The comparator reset transistor (Tcr) may be turned on by a comparator reset signal CRG, and may reset the first input terminal of the comparator 530 to a voltage of the output terminal of the comparator 530. The voltage of the output terminal of the comparator 530 may have a level corresponding to the voltage difference between the ramp signal ($V_{ramp}$) and the pixel signal ($V_{px}$). Since the ramp signal ($V_{ramp}$) gradually decreases, the voltage of the output terminal of the comparator 530 may converge on a logic low level after a predetermined time. In this case, the logic low level may refer to a voltage for resetting the first input terminal of the comparator 530.

A ramp signal generator (not shown) may generate the ramp signal ($V_{ramp}$), a voltage of which decreases with a specific slope, so that the ramp signal generator may apply the ramp signal ($V_{ramp}$) to the second input terminal of the comparator 530.

The comparator 530 may compare the pixel signal ($V_{px}$) with the ramp signal ($V_{ramp}$) to generate a comparison signal corresponding to the voltage difference between the pixel signal ($V_{px}$) and the ramp signal ($V_{ramp}$). For example, when the pixel signal ($V_{px}$) is larger in magnitude (or is higher in level) than the ramp signal ($V_{ramp}$), the comparison signal may have a logic low level. Conversely, when the pixel signal ($V_{px}$) is smaller in magnitude than the ramp signal ($V_{ramp}$), the comparison signal may have a logic high level.

Referring to FIG. 6, the comparator 600 may be one example of the comparator 530 shown in FIG. 5.

The comparator 600 may include a load stage 610, a separation stage 620, an input stage 630, and a bias stage 640. The comparator 600 may include an operational amplifier (OP AMP) to which no feedback signals are applied.

The load stage 610, the separation stage 620, the input stage 630, and the bias stage 640 may implement a differential amplifier coupled between a first bias voltage ($V_{dda}$) and a second bias voltage ($V_{ssa}$).

The load stage 610 may include a first PMOS transistor MP1 and a second PMOS transistor MP2. A gate electrode of the first PMOS transistor MP1 may be coupled to a gate electrode of the second PMOS transistor MP2. Each of a source electrode of the first PMOS transistor MP1 and a source electrode of the second PMOS transistor MP2 may receive the first bias voltage ($V_{dda}$). A drain electrode of the first PMOS transistor MP1 may be coupled to the gate electrode of the first PMOS transistor MP1, so that a comparison signal ($V_c$) corresponding to an output signal of the comparator 600 may be output through a drain electrode of the second PMOS transistor MP2.

The input stage 630 may include a first NMOS transistor MN1 and a second NMOS transistor MN2. A gate electrode of the first NMOS transistor MN1 may receive the ramp signal ($V_{ramp}$), and a gate electrode of the second NMOS transistor MN2 may receive the pixel signal ($V_{px}$).

It is assumed that the gate electrode of the first NMOS transistor MN1 is identical in size to the gate electrode of the second NMOS transistor MN2. In this case, the gate electrode of the first NMOS transistor MN1 of the image ADC may be larger in size than the gate electrode of the first NMOS transistor MN1 of the PUF ADC, and the gate electrode of the second NMOS transistor MN2 of the image ADC may be larger in size than the gate electrode of the second NMOS transistor MN2 of the PUF ADC.

The separation stage 620 may include a third NMOS transistor MN3 coupled between the first PMOS transistor MP1 and the first NMOS transistor MN1, and a fourth NMOS transistor MN4 coupled between the second PMOS transistor MP2 and the second NMOS transistor MN2. A gate electrode of the third NMOS transistor MN3 and a gate electrode of the fourth NMOS transistor MN4 may be coupled to the first bias voltage ($V_{dda}$). The separation stage 620 may stabilize a voltage level of the comparison signal ($V_c$) while the comparison signal ($V_c$) is output.

The bias stage 640 may include a fifth NMOS transistor MN5 and a sixth NMOS transistor MN6 that are coupled in series between the input stage 630 and the second bias voltage ($V_{ssa}$).

A fifth NMOS transistor MN5 may receive a cascade control voltage ($V_{casc}$), and may control a cascade connection between the input stage 630 and the sixth NMOS transistor MN6. That is, when the fifth NMOS transistor MN5 is turned on, a bias current may be supplied to the input stage 630 through the sixth NMOS transistor MN6.

The sixth NMOS transistor MN6 may receive a bias control voltage ($V_{bias}$), and may apply the bias current to the input stage 630. In this case, the magnitude of the bias current may be determined based on the bias control voltage ($V_{bias}$).

The gate electrode of the sixth NMOS transistor MN6 of the image ADC may be larger in size than the gate electrode of the sixth NMOS transistor MN6 of the PUF ADC.

The cascade control voltage ($V_{casc}$) and the bias control voltage ($V_{bias}$) may be received from the timing controller 170.

As described above, when the pixel signal ($V_{px}$) is higher in level than the ramp signal ($V_{ramp}$), the comparison signal ($V_c$) may have a voltage (e.g., the second bias voltage $V_{ssa}$) corresponding to a logic low level. In contrast, when the pixel signal ($V_{px}$) is lower in level than the ramp signal ($V_{ramp}$), the comparison signal ($V_c$) may have a voltage (e.g., the first bias voltage $V_{dda}$) corresponding to a logic high level.

Referring back to FIG. 5, the counter 540 may be synchronized to an edge (e.g., a rising edge or a falling edge) of a clock signal supplied from the timing controller 170, so that the counter 540 may perform counting in response to a level of the comparison signal. A time period in which the counter 540 can perform counting may be defined as a countable range. This countable range may refer to a time period ranging from a start point where the voltage of the ramp signal ($V_{ramp}$) begins to decrease with a constant slope to an end point where a predetermined time has elapsed from the start point.

The counter 540 may perform counting until the comparison signal transitions from a first level (e.g., a logic high level) to a second level (e.g., a logic low level) during the countable range, and may output the accumulated counting value either as image data (IDATA) or as PUF data (PDATA).

Figure 7:
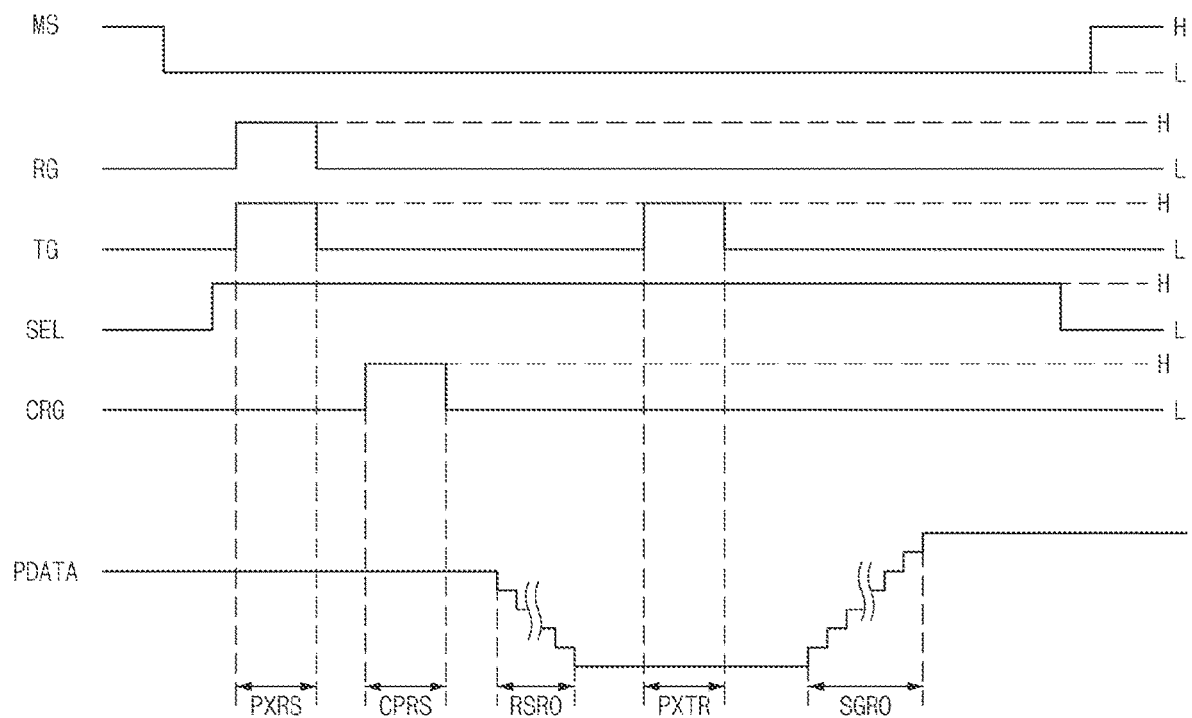
FIG. 7 is a timing diagram illustrating an example of how physical unclonable function (PUF) data can be generated based on some implementations of the disclosed technology.

FIG. 7 is a timing diagram illustrating an example of how PUF data can be generated based on some implementations of the disclosed technology.

As can be seen from FIG. 7, when the image sensing device 100 operates in the first PUF mode, a plurality of control signals MS, RG, TG, SEL, and CRG may be used to control the image sensing device 100, and PUF data (PDATA) may be generated by the image sensing device 100.

First, while the image sensing device 100 operates in the first PUF mode, a mechanical shutter control signal MS may be at a logic low level (L). The mechanical shutter control signal MS may be used to control the operation of a mechanical shutter (not shown) designed to control the amount of light incident upon the pixel array 110. When the mechanical shutter control signal MS is at a logic low level (L), the mechanical shutter (not shown) can block light incident upon the pixel array 110. When the mechanical shutter control signal MS is at a logic high level (H), the mechanical shutter (not shown) may allow light incident upon the pixel array to pass therethrough.

In the first PUF mode, the image sensing device 100 may sequentially operate in the order of (1) a pixel reset section PXRS, (2) a comparator reset section CPRS, (3) a reset readout section RSRO, (4) a pixel transmission section PXTR, and (5) a signal readout section SGRO.

The pixel reset section PXRS may include an operation that removes photocharges from the PUF pixel 510 and resets the floating diffusion region FD to the power-supply voltage ($VDD_{px}$). In the pixel reset section PXRS, each of the pixel reset signal RG, the transfer signal TG, and the row selection signal SEL may have a logic high level (H), and the comparator reset signal CRG may have a logic low level (L). Accordingly, the reset transistor RX, the transfer transistor TX, and the selection transistor SX may be turned on.

The comparator reset section CPRS may refer to an operation section in which the PUF comparator 530 is reset to initialize the voltage of the first input terminal of the PUF comparator 530. In the comparator reset section CPRS, each of the row selection signal SEL and the comparator reset signal CRG may have a logic high level (H), and each of the pixel reset signal RG and the transfer signal TG may have a logic low level (L). Accordingly, the selection transistor SX and the comparator reset transistor (Tcr) may be turned on.

During the reset readout section RSRO, the PUF pixel 510 outputs a reference signal corresponding to a voltage of the reset floating diffusion region and the PUF ADC 520 compares the reference signal with the ramp signal ($V_{ramp}$) to generate PUF data (PDATA) corresponding to the result of comparison between the reference signal and the ramp signal ($V_{ramp}$). In the reset readout section RSRO, the row selection signal SEL may have a logic high level (H), and each of the pixel reset signal RG, the transfer signal TG, and the comparator reset signal CRG may have a logic low level (L). Accordingly, the selection transistor SX may be turned on. In the reset readout section RSRO, the counter 540 of the PUF ADC 520 may count (e.g., downcounting) from an initial value (e.g., sequential subtraction from an initial value) until the comparison signal transitions from a logic high level to a logic low level. After completion of the downcounting operation, the counter 540 may retain the accumulated count value.

In the pixel transmission section PXTR, photocharges accumulated in the photoelectric conversion element PD may be transmitted to the floating diffusion region FD, and an image signal corresponding to a voltage of the floating diffusion region FD may be transmitted from the PUF pixel 510 to the PUF ADC 520. In the pixel transmission section PXTR, each of the transfer signal TG and the row selection signal SEL may have a logic high level (H), and the pixel reset signal RG and the comparator reset signal CRG may have a logic low level (L). Accordingly, the transfer transistor TX and the selection transistor SX may be turned on.

During the signal readout section SGRO, the PUF ADC 520 compares the image signal with the ramp signal ($V_{ramp}$) and generates PUF data (PDATA) corresponding to the result of comparison. In the signal readout section SGRO, the row selection signal SEL may have a logic high level (H), and each of the pixel reset signal RG, the transfer signal TG, and the comparator reset signal CRG may have a logic low level (L). Therefore, the selection transistor SX may be turned on. In the signal readout section SGRO, the counter 540 of the PUF ADC 520 may perform upcounting in which sequential addition from a current value is performed until the comparison signal transitions from a logic high level to a logic low level. After completion of the upcounting operation, the counter 540 may retain the accumulated count value.

The counter 540 performs the downcounting in the reset readout section RSRO and performs the upcounting in the signal readout section SGRO, so that a count value corresponding to the reference signal can be subtracted from the other count value corresponding to the image signal, resulting in formation of PUF data (PDATA) from which reset noise is removed. That is, the imaging device based on some implementations of the disclosed technology can enable the PUF ADC 520 to further perform the function of the correlated double sampler (CDS) 130 without using a separate CDS 130.

That is, the first PUF mode may refer to an operation mode in which fixed pattern noise (FPN) caused by leakage current generated from the PUF pixel can be obtained in a specific condition (i.e., a dark condition) where light is not transmitted to the pixel array 110.

The PUF acquisition unit 200 may determine the first FPN data based on the result of comparison between PUF data (PDATA) received from the image sensing device 100 operating in the first PUF mode and a predetermined first threshold value. When PUF data (PDATA) is equal to or greater than the first threshold value, the PUF acquisition unit 200 may determine the first FPN data to be a first logic level (e.g., 1). When PUF data (PDATA) is less than the first threshold value, the PUF acquisition unit 200 may determine the first FPN data to be a second logic level (e.g., 0).

Although FIG. 7 illustrates that PUF data (PDATA) is generated in a state where the dark condition is formed through operation of a mechanical shutter (not shown), it should be noted that PUF data (PDATA) corresponding to the FPN can also be generated without using the mechanical shutter (not shown). For example, in the pixel transmission section PXTR, the transfer transistor TX remains turned off and PUF data (PDATA) corresponding to a leakage current flowing into the floating diffusion region FD is generated, so that PUF data (PDATA) corresponding to the FPN may also be generated without using the mechanical shutter (not shown).

Figure 8:
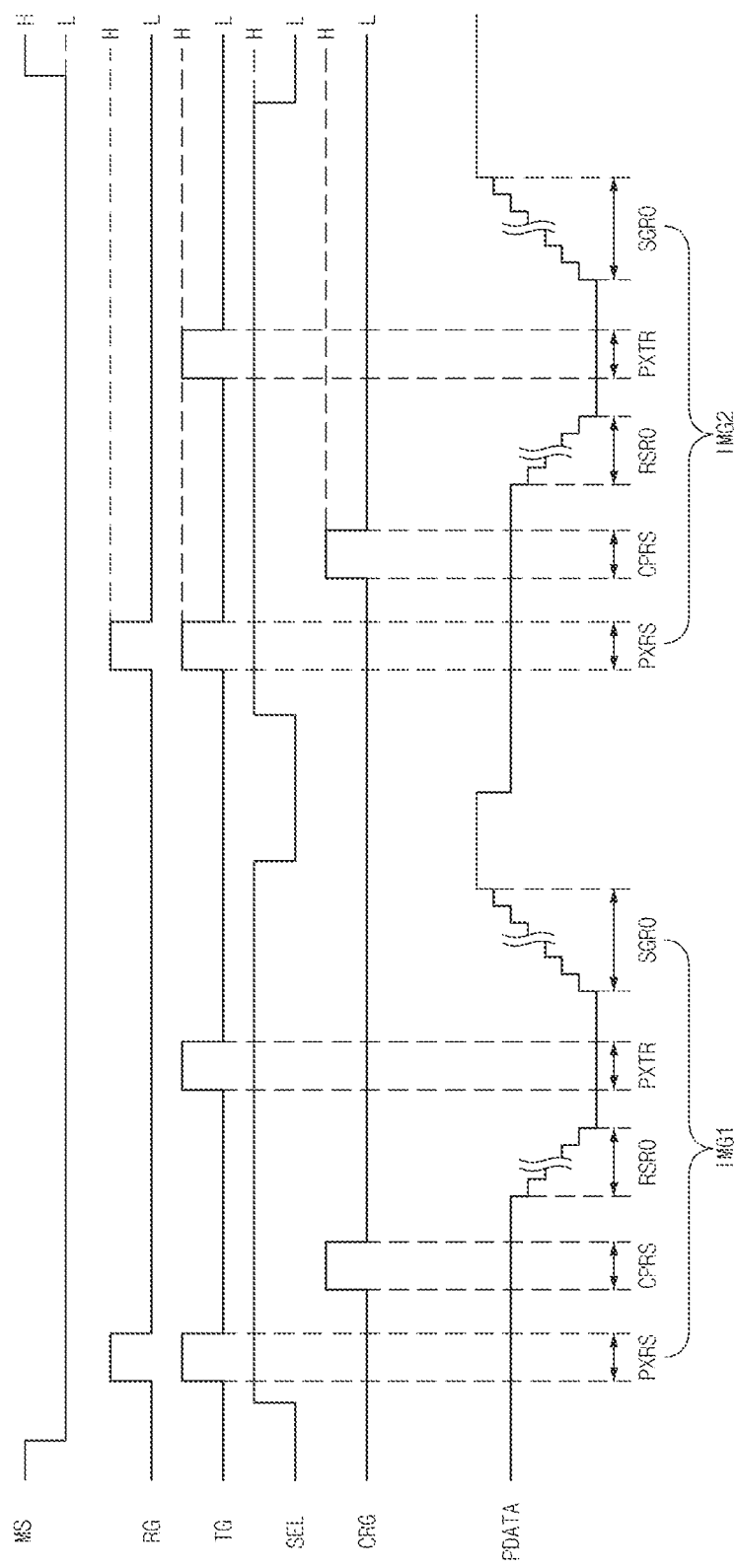
FIG. 8 is a timing diagram illustrating another example of how PUF data can be generated based on some implementations of the disclosed technology.

FIG. 8 is a timing diagram illustrating another example of how PUF data (PDATA) can be generated based on some implementations of the disclosed technology.

As can be seen from FIG. 8, when the image sensing device 100 operates in the second PUF mode, a plurality of control signals MS, RG, TG, SEL, and CRG may be used to control the image sensing device 100, and PUF data (PDATA) may be generated by the image sensing device 100.

First, while the image sensing device 100 operates in the second PUF mode, the mechanical shutter control signal MS may be kept at a logic high level (H). Therefore, the mechanical shutter (not shown) may allow light incident upon the pixel array 110 to pass therethrough.

In the second PUF mode, the image sensing device 100 may operate in the order of a first image acquisition section IMG1 and a second image acquisition section IMG2. Each of the first image acquisition section IMG1 and the second image acquisition section IMG2 may operate in the order of (1) the pixel reset section PXRS, (2) the comparator reset section CPRS, (3) the reset readout section RSRO, (4) the pixel transmission section PXTR, and (5) the signal readout section SGRO.

The operations of the image sensing device 100 configured to operate in the pixel reset section PXRS, the comparator reset section CPRS, the reset readout section RSRO, the pixel transmission section PXTR, and the signal readout section SGRO shown in FIG. 8 are identical or similar to those of FIG. 7.

In the second PUF mode, the image sensing device 100 may continuously generate PUF data (PDATA) corresponding to the intensity of light incident upon the PUF pixel. A time gap between the first image acquisition section IMG1 and the second image acquisition section IMG2 may be set to a very short time. In this case, there is a high possibility that PUF data (PDATA) generated in the first image acquisition section IMG1 and the other PUF data (PDATA) generated in the second image acquisition section IMG2 have the same or very similar value.

However, the gate electrode of the drive transistor DX of the PUF pixel may be larger in size than the gate electrode of the drive transistor DX of the image pixel. The drive transistor DX may convert the voltage or electrical potential of the floating diffusion region FD into a voltage signal. The drive transistor DX of the PUF pixel having a relatively smaller gate area may generate noise with a relatively high frequency or amplitude in the conversion process. In addition, noise in the drive transistor DX of the PUF pixel may be generated in a random fashion, and the change in such noise generated with a relatively high frequency or amplitude may be used as meaningful data.

Therefore, each of PUF data (PDATA) generated in the first image acquisition section IMG1 based on the voltage signal of the drive transistor DX and the other PUF data (PDATA) generated in the second image acquisition section IMG2 based on the voltage signal of the drive transistor DX may include noise generated in the drive transistor DX.

That is, the second PUF mode may refer to an operation mode in which the random telegraph noise (RTN) caused by changes in the noise generated in the drive transistor DX of the PUF pixel having detected the same incident light can be obtained.

Upon receiving first PUF data (PDATA) of the first image acquisition section IMG1 and second PUF data (PDATA) of the second image acquisition section IMG2 from the image sensing device 100 operating in the second PUF mode, the PUF acquisition unit 200 may perform a subtraction operation on the first PUF data (PDATA) and the second PUF data (PDATA) (e.g., subtracting the second PUF data (PDATA) from the first PUF data (PDATA)), and may determine the first RTN data by comparing the result of such subtraction with a predetermined second threshold value. When the result of subtraction is equal to or greater than the second threshold value, the PUF acquisition unit 200 may determine the first RTN data to be a first logic level (e.g., 1). When the result of subtraction is less than the second threshold value, the PUF acquisition unit 200 may determine the first RTN data to be a second logic level (e.g., 0).

Figure 9:
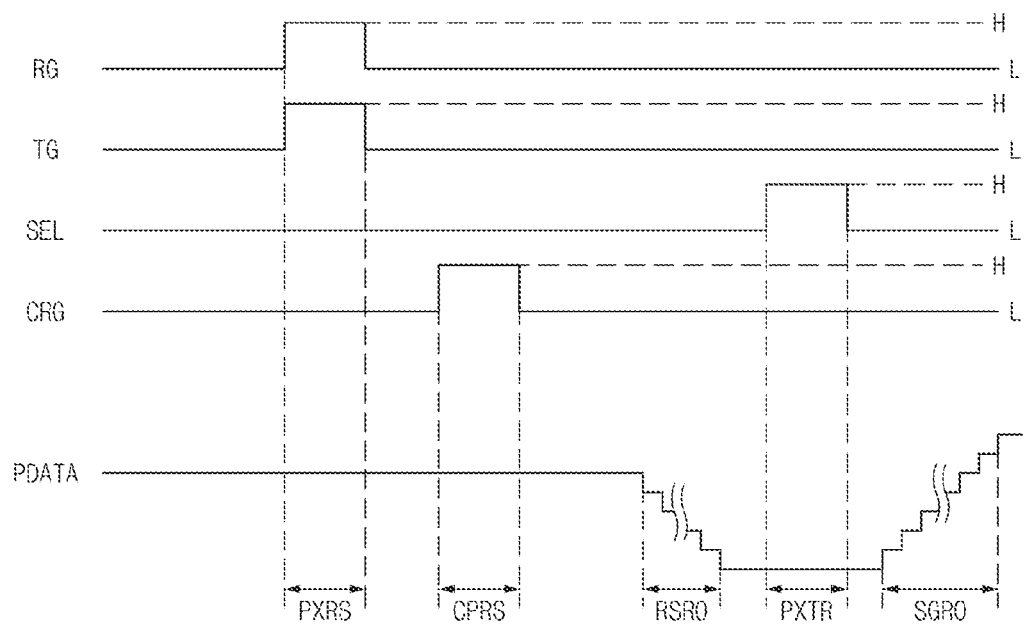
FIG. 9 is a timing diagram illustrating another example of how PUF data can be generated based on some implementations of the disclosed technology.

FIG. 9 is a timing diagram illustrating another example of how PUF data (PDATA) can be generated based on some implementations of the disclosed technology.

As can be seen from FIG. 9, when the image sensing device 100 operates in the third PUF mode, a plurality of control signals RG, TG, SEL, and CRG may be used to control the image sensing device 100, and PUF data (PDATA) may be generated by the image sensing device 100.

In the third PUF mode, the image sensing device 100 may operate in the order of (1) the pixel reset section PXRS, (2) the comparator reset section CPRS, (3) the reset readout section RSRO, (4) the pixel transmission section PXTR, and (5) the signal readout section SGRO.

The operations of the image sensing device 100 configured to operate in the pixel reset section PXRS, the comparator reset section CPRS, the reset readout section RSRO, the pixel transmission section PXTR, and the signal readout section SGRO shown in FIG. 9 are identical or very similar to those of FIG. 7. For convenience of description, the differences between the operations of the image sensing device 100 shown in FIG. 9 and those of the image sensing device 100 shown in FIG. 7 will be discussed below.

The pixel reset section PXRS may include an operation that removes photocharges from the PUF pixel 510 and resets the floating diffusion region FD to the power-supply voltage ($VDD_{px}$). In the pixel reset section PXRS, each of the pixel reset signal RG and the transfer signal TG may have a logic high level (H), and the comparator reset signal CRG may have a logic low level (L). Accordingly, the reset transistor RX and the transfer transistor TX may be turned on. Unlike the pixel reset section PXRS shown in FIG. 7, the selection transistor SX shown in FIG. 9 may be turned off.

The comparator reset section CPRS may refer to an operation section in which the PUF comparator 530 is reset to initialize the voltage of the first input terminal of the PUF comparator 530. In the comparator reset section CPRS, the comparator reset signal CRG may have a logic high level (H), and each of the pixel reset signal RG, the transfer signal TG, and the row selection signal SEL may have a logic low level (L). Accordingly, the comparator reset transistor (Tcr) may be turned on. Unlike the comparator reset section CPRS shown in FIG. 7, the selection transistor SX shown in FIG. 9 may be turned off.

During the reset readout section RSRO, the PUF ADC 520 compares the voltage (i.e., the comparator reset signal) of the first input terminal of the reset PUF comparator 530 with the ramp signal ($V_{ramp}$) and generates PUF data (PDATA) corresponding to the result of comparison. In the reset readout section RSRO, the pixel reset signal RG, the transfer signal TG, the row selection signal SEL, and the comparator reset signal CRG may have a logic low level (L). In the reset readout section RSRO, the counter 540 of the PUF ADC 520 may downcount from an initial value (e.g., sequential subtraction from an initial value) until the comparison signal transitions from a logic high level to a logic low level. After completion of the downcounting operation, the counter 540 may retain the accumulated count value. Unlike the reset readout section RSRO shown in FIG. 7, the selection transistor SX shown in FIG. 9 may be turned off. This is because, during the reset readout section RSRO, a signal corresponding to a reset state of the PUF comparator 530 is read out, whereas a signal corresponding to a reset state of the PUF pixel 510 is not read out.

During the pixel transmission section PXTR, the reference signal corresponding to the voltage of the reset floating diffusion region FD is output from the PUF pixel 510 and is then transmitted to the PUF ADC 520. In the pixel transmission section PXTR, the row selection signal SEL may have a logic high level (H), and each of the pixel reset signal RG, the transfer signal TG, and the comparator reset signal CRG may have a logic low level (L). Accordingly, the selection transistor SX may be turned on. Unlike the pixel transmission section PXTR shown in FIG. 7, the transfer transistor TX shown in FIG. 9 may be turned off.

The signal readout section SGRO may refer to an operation section in which the PUF ADC 520 receives the reference signal, compares the received reference signal with the ramp signal ($V_{ramp}$), and thus generates PUF data (PDATA) corresponding to the result of comparison. In the signal readout section SGRO, each of the pixel reset signal RG, the transfer signal TG, the row selection signal SEL, and the comparator reset signal CRG may have a logic low level (L). In the signal readout section SGRO, the counter 540 of the PUF ADC 520 may upcount from a current value (e.g., sequential addition from a current value) until the comparison signal transitions from a logic high level to a logic low level. After completion of the upcounting operation, the counter 540 may retain the accumulated count value. Unlike the signal readout section SGRO shown in FIG. 7, the selection transistor SX shown in FIG. 9 may be turned off. This is because, during the signal readout section SGRO shown in FIG. 9, the reference signal generated from the PUF pixel 510 is read out, whereas the image signal generated from the PUF pixel 510 is not read out. In other words, the reference signal has already been transmitted to the PUF ADC 520 in the pixel transmission section PXTR.

In the reset readout section RSRO, the counter 520 may perform the downcounting. In the signal readout section SGRO, the counter 540 may perform the upcounting. As a result, the count value corresponding to the comparator reset signal may be subtracted from the other count value corresponding to the reference signal, so that PUF data (PDATA) from which reset noise of the PUF comparator 530 is removed can be generated.

The gate electrode of the first NMOS transistor MN1 of the PUF ADC may be smaller in size than the gate electrode of the first NMOS transistor MN1 of the image ADC. In addition, the gate electrode of the second NMOS transistor MN2 of the PUF ADC may be smaller in size than the gate electrode of the second NMOS transistor MN2 of the image ADC.

The first NMOS transistor MN1 may receive the ramp signal ($V_{ramp}$), and the second NMOS transistor MN2 may receive the pixel signal ($V_{px}$). The voltage difference between a drain current generated by the first NMOS transistor MN1 and a drain current generated by the second NMOS transistor MN2 may correspond to the voltage difference between the ramp signal ($V_{ramp}$) and the pixel signal ($V_{px}$). In other words, the first NMOS transistor MN1 and the second NMOS transistor MN2 may generate a drain current corresponding to the voltage difference between the ramp signal ($V_{ramp}$) and the pixel signal ($V_{px}$), so that the comparison signal ($V_c$) has a voltage corresponding to a logic low level or a logic high level. As a result, the voltage difference between the ramp signal ($V_{ramp}$) and the pixel signal ($V_{px}$) can be converted into the comparison signal ($V_c$).

The first NMOS transistor MN1 and the second NMOS transistor MN2 of the PUF ADC having a relatively smaller gate area may generate noise with a relatively high frequency or amplitude during the conversion process. In addition, noise to be generated from the first NMOS transistor MN1 and the second NMOS transistor MN2 of the PUF ADC may randomly occur, and the change in noise generated with a relatively high frequency or amplitude may be used as meaningful data.

The gate electrode of the sixth NMOS transistor MN6 of the PUF ADC may be smaller in size than the gate electrode of the sixth NMOS transistor MN6 of the image ADC.

The sixth NMOS transistor MN6 may apply a bias current corresponding to the bias control voltage ($V_{bias}$) to the input stage 630. Here, the bias current may determine a logic low level of the comparison signal ($V_c$). For example, as the bias current increases, the logic low level of the comparison signal ($V_c$) may decrease closer to the second bias voltage ($V_{ssa}$).

The sixth NMOS transistor MN6 of the PUF ADC having a relatively smaller gate area may generate noise with a relatively high frequency or amplitude during the process of generating the bias current. In addition, noise to be generated in the sixth NMOS transistor MN6 of the PUF ADC may randomly occur, and the change in noise generated with a relatively high frequency or amplitude may be used as meaningful data.

Accordingly, PUF data (PDATA) generated in the signal readout section SGRO after passing through the reset readout section RSRO may include noise generated in the PUF ADC.

In other words, the third PUF mode may refer to an operation mode in which the RTN caused by the change in noise generated by the PUF ADC 520 designed to generate PUF data (PDATA) corresponding to the reference signal of the PUF pixel 510 can be obtained.

The amount of noise generated in the PUF ADC 520 may be relatively larger than the amount of noise generated in the PUF pixel 510. That is, although pixels belonging to the same column coupled to the PUF ADC 520 in which the relatively large amount of noise has occurred output various signals, PUF data (PDATA) generated by the PUF ADC 520 may represent the same value (e.g., 1).

In another embodiment, the pixel transmission section PXTR may be omitted from the third PUF mode operation. That is, the row selection signal SEL may be kept at a logic low level (L) in a time section corresponding to the pixel transmission section PXTR. As a result, it is possible for PUF data (PDATA) to include only noise generated from the PUF ADC 520 other than noise generated from the PUF pixel 510.

The PUF acquisition unit 200 may determine the second RTN data based on the result of comparison between PUF data (PDATA) received from the image sensing device 100 operating in the third PUF mode and a third threshold value. When the PUF data (PDATA) is equal to or greater than the third threshold value, the PUF acquisition unit 200 may determine the second RTN data to be a first logic level (e.g., 1). When the PUF data (PDATA) is less than the third threshold value, the PUF acquisition unit 200 may determine the second RTN data to be a second logic level (e.g., 0).

Figure 10:
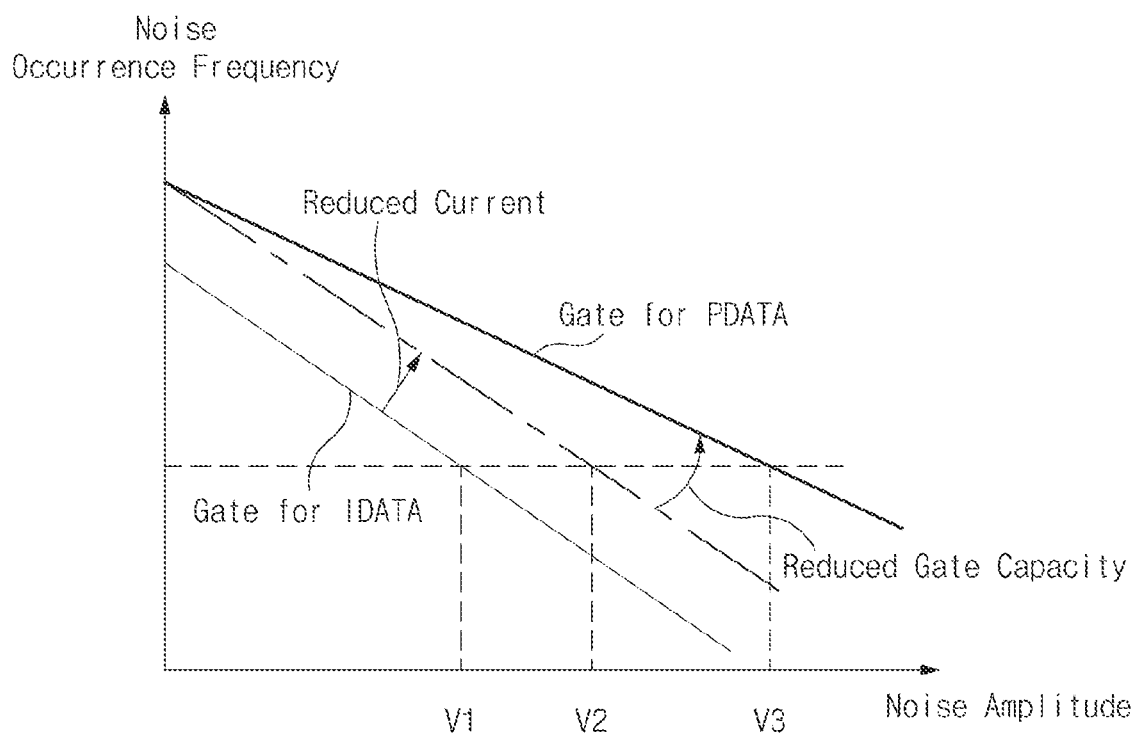
FIG. 10 is a graph illustrating an example of how random telegraph noise (RTN) can be generated based on some implementations of the disclosed technology.

FIG. 10 is a graph illustrating an example of how a random telegraph noise (RTN) can be generated based on some implementations of the disclosed technology.

FIG. 10 is a graph illustrating the relationship between a noise amplitude and a frequency of occurrence of random telegraph noise (RTN) generated in one or more transistors. In the graph of FIG. 10, an X-axis represents amplitude (or magnitude) of the RTN, and a Y-axis represents a frequency of occurrence of the RTN (or RTN occurrence probability). The RTN of the transistor may refer to noise that occurs in either an output current or an output voltage being output to a drain or source electrode of the transistor in response to an input voltage to be input to a gate electrode of the transistor.

Generally, the frequency of occurrence of the RTN generated in the transistor may decrease as the amplitude of the RTN increases, and may increase as the amplitude of the RTN decreases. In addition, the RTN amplitude and the RTN occurrence frequency may vary depending on the size of a gate area of the transistor. That is, the RTN amplitude and the RTN occurrence frequency may be changed with the repeated squares (power or involution) of a gate area of the transistor.

When the gate electrode of the transistor is reduced in size, the output current of the transistor may decrease, and a signal-to-noise ratio (SNR) may also decrease as the output current of the transistor decreases, thereby increasing the RTN occurrence frequency at the same RTN amplitude.

In addition, when the gate electrode of the transistor is reduced in size, a total amount of gate charges (or gate capacitance) corresponding to the amount of charges that should be injected into the gate electrode to operate (or to turn on) the transistor may decrease. As the total amount of gate charges decreases in the gate electrode of the transistor, the RTN amplitude (corresponding to a slope of a straight line depicted in the graph) per occurrence frequency of the RTN may increase (i.e., the slope of the straight line depicted in the graph may decrease).

In the image sensing device 100, one or more transistors related to generation of the image data (IDATA) can be designed to generate less RTN, so that noise that may occur in the image data (IDATA) can be minimized. FIG. 10 is a graph illustrating one example of the first RTN feature (denoted by "Gate for IDATA" in FIG. 10) related to the transistor gate for the image data (IDATA).

However, the transistor related to generation of the PUF data (PDATA) may be designed to have a smaller-sized gate area than the other transistor for the image data (IDATA), so that the transistor related to generation of the PUF data (PDATA) can intentionally control the PUF data (PDATA) to include noise that may occur with a predetermined range of the frequency of noise occurrence and a predetermined range of the noise amplitude.

Since the transistor related to generation of the PUF data (PDATA) has a relatively small gate area, the output current of the transistor decreases, so that the RTN occurrence frequency may greatly increase (denoted by "Reduced Current" in FIG. 10) at the same RTN amplitude as compared to the first RTN feature (denoted by "Gate for IDATA" in FIG. 10).

Since the transistor related to generation of the PUF data (PDATA) has a relatively small-sized gate area, a total amount of gate charges (or gate capacitance) of the transistor decreases, so that the RTN amplitude (corresponding to a slope of a straight line depicted in the graph) per occurrence frequency of the RTN may increase (i.e., the slope of the straight line depicted in the graph may decrease) as denoted by "Reduced Gate Capacity" in FIG. 10.

In other words, the transistor related to generation of the PUF data (PDATA) has a relatively smaller-sized gate area, so that the RTN occurrence frequency and the RTN amplitude can increase simultaneously.

As can be seen from FIG. 10, the transistor related to generation of the PUF data (PDATA) has a relatively small-sized gate area, so that the noise amplitude may sequentially increase in the order of (1) a first noise amplitude V1 (generated in the transistor related to generation of the image data (IDATA) at the same noise occurrence frequency), (2) a second noise amplitude V2 (corresponding to a case where only the output current of the transistor decreases), (3) a third noise amplitude V3 (corresponding to a case where a total amount of gate charges of the transistor also decreases).

In this case, the transistor related to generation of the PUF data (PDATA) may be at least one of the drive transistor DX of the PUF pixel, the first NMOS transistor MN1, the second NMOS transistor MN2, and the sixth NMOS transistor MN6 of the PUF ADC, as described above. Although the above-mentioned implementations have disclosed only four transistors for convenience of description, other implementations are also possible, and the gate electrode of another transistor related to generation of the PUF data (PDATA) can be adjusted in size for RTN occurrence.

In addition, although the imaging device according to one embodiment of the disclosed technology has disclosed the image sensing device for generating random telegraph noise (RTN) in PUF data (PDATA) by adjusting the size of a gate area of transistor(s) related to generation of the PUF data (PDATA), other implementations are also possible, and the imaging device according to another embodiment of the disclosed technology can generate RTN in PUF data (PDATA) by adjusting a threshold voltage of transistor(s) related to generation of PUF data (PDATA). For example, a threshold voltage of the transistor related to generation of PUF data (PDATA) may be greater than a threshold voltage of a related transistor from among transistors related to generation of image data (IDATA).

In other words, the transistor (or the first transistor) related to generation of PUF data (PDATA) may have different characteristics from another transistor (or the second transistor) (corresponding to at least one transistor related to generation of PUF data PDATA) from among plural transistors related to generation of image data (IDATA). In this case, although transistor characteristics based on some implementations of the disclosed technology have been disclosed using the gate region or the threshold voltage as examples, it should be noted that other characteristics capable of intentionally generating the RTN can also be included in the transistor characteristics as needed.

As is apparent from the above description, the imaging device 10 based on some implementations of the disclosed technology can encrypt image data not only using information fixed by internal unique characteristics of the imaging device 10, but also using information randomly generated based on the unique characteristics, and can thus prevent malicious exploitation and unauthorized use of the image data by others.

The embodiments of the disclosed technology may provide a variety of effects capable of being directly or indirectly recognized through the above-mentioned patent document.

The embodiments of the disclosed technology may be implemented in various ways to achieve one or more advantages or desired effects.

Although a number of illustrative embodiments have been described, it should be understood that modifications and enhancements to the disclosed embodiments and other embodiments can be devised based on what is described and/or illustrated in this patent document.

What is claimed is:
1. An imaging device comprising:
an image sensing device including
an image generator configured to generate image data by converting incident light carrying an image into electric signals indicative of the image, and
a physical unclonable function (PUF) generator configured to generate physical unclonable function (PUF) data associated with unique physical characteristics of the image sensing device and including at least one fixed pattern noise (FPN) data value corresponding to a fixed pattern noise of the image sensing device and at least one random telegraph noise (RTN) data value corresponding to a random telegraph noise of the image sensing device;

a private key generation unit in communication with the image sensing device and configured to generate a private key based on the at least one FPN data value and the at least one RTN data value acquired from the PUF data; and an image encryption unit in communication with the image sensing device and the private key generation unit and configured to encrypt the image data using the private key, wherein the PUF generator includes a first transistor and the image generator includes a second transistor corresponding to the first transistor, and wherein the first transistor exhibits different properties from the second transistor.

2. The imaging device according to claim 1, wherein: the first transistor has a smaller gate area than the second transistor.

3. The imaging device according to claim 1, wherein: the first transistor has a higher threshold voltage than the second transistor.

4. The imaging device according to claim 1, wherein: the PUF generator is configured to generate the PUF data based on a pixel signal that is generated while incident light is blocked, wherein the PUF data includes information about the at least one FPN data value.

5. The imaging device according to claim 4, further comprising:

a physical unclonable function (PUF) acquisition unit configured to acquire the at least one FPN data value from the PUF data, wherein the PUF acquisition unit determines whether the at least one FPN data value is a first logic level or a second logic level by comparing the PUF data with a first threshold value.

6. The imaging device according to claim 1, wherein each of the image generator and the PUF generator includes:

a drive transistor configured to convert an electric potential of a floating diffusion region that holds photocharges into a voltage signal.

7. The imaging device according to claim 6, wherein: the first transistor corresponds to the drive transistor included in the PUF generator; and the second transistor corresponds to the drive transistor included in the image generator.

8. The imaging device according to claim 6, wherein: the PUF generator generates the PUF data in each of a first image acquisition section and a second image acquisition section that are consecutively coupled to each other, based on the voltage signal of the drive transistor, wherein the PUF data includes information about a first random telegraph noise (RTN) data value from among the at least one RTN data.

9. The imaging device according to claim 8, further comprising:

a physical unclonable function (PUF) acquisition unit configured to acquire the at least one RTN data value from the PUF data, wherein the PUF acquisition unit performs a subtraction operation on the first PUF data generated in the first image acquisition section and the second PUF data generated in the second image acquisition section, and determines whether a first RTN data value is a first logic level or a second logic level by comparing a result of the subtraction operation with a second threshold value.

10. The imaging device according to claim 1, wherein each of the image generator and the PUF generator includes:

a comparator configured to compare a pixel signal with a ramp signal, and generate a comparison signal corresponding to a voltage difference between the pixel signal and the ramp signal based on the result of the comparison between the pixel signal and the ramp signal; and a counter configured to perform a counting operation in response to a level of the comparison signal.

11. The imaging device according to claim 10, wherein: the comparator includes a transistor configured to receive the pixel signal and a transistor configured to receive the ramp signal;

the first transistor includes a transistor that is included in the PUF generator and receives the pixel signal, and a transistor that receives the ramp signal; and the second transistor includes a transistor that is included in the image generator and receives the pixel signal, a transistor that receives the ramp signal.

12. The imaging device according to claim 11, wherein: the comparator further includes a transistor for applying a bias current to the transistor receiving the pixel signal and the transistor receiving the ramp signal, the first transistor corresponds to the transistor that is included in the PUF generator to apply the bias current; and the second transistor corresponds to the transistor that is included in the image generator to apply the bias current.

13. The imaging device according to claim 10, wherein: the PUF generator generates the PUF data in a state where a selection transistor configured to output the pixel signal is turned off, wherein the PUF data includes information about a second RTN data value from among the at least one RTN data value.

14. The imaging device according to claim 13, further comprising:

a physical unclonable function (PUF) acquisition unit configured to acquire the at least one RTN data value from the PUF data, wherein the PUF acquisition unit determines the second RTN data value to be a first logic level or a second logic level by comparing the PUF data with a third threshold value.

15. An imaging device comprising:
an image sensing device including:
one or more first image detection pixels and one or more second image detection pixels structured to convert light incident onto the image detection pixels into pixel signals representing an image;

a first transistor coupled to the one or more first image detection pixels and structured to generate physical unclonable function (PUF) data including information about at least one fixed pattern noise (FPN) data value and at least one random telegraph noise (RTN) data value; and a second transistor coupled to the one or more second image detection pixels and structured to generate image data acquired by converting light corresponding to the image;

a private key generation unit configured to generate a private key based on the at least one FPN data value and the at least one RTN data value of the PUF data; and an image encryption unit configured to encrypt the image data using the private key, wherein the first transistor exhibits different noise properties from the second transistor.

16. The imaging device according to claim 15, wherein: the first transistor has a smaller gate area than the second transistor.

17. The imaging device according to claim 15, wherein: the first transistor has a higher threshold voltage than the second transistor.

18. The imaging device according to claim 15, wherein the at least one FPN data value and the at least one RTN data value include noise patterns unique to the image sensing device.

19. The imaging device according to claim 15, wherein the private key includes an identifier for identifying the image data.

* * * * *